United States Patent [19]

Szczyrbowski et al.

[11] Patent Number: 5,201,926
[45] Date of Patent: Apr. 13, 1993

[54] METHOD FOR THE PRODUCTION OF COATED GLASS WITH A HIGH TRANSMISSIVITY IN THE VISIBLE SPECTRAL RANGE AND WITH A HIGH REFLECTIVITY FOR THERMAL RADIATION

[75] Inventors: Joachim Szczyrbowski, Goldbach; Anton Dietrich, Wiesenfelden; Klaus Hartig, Ronneburg, all of Fed. Rep. of Germany

[73] Assignee: Leybold Aktiengesellschaft, Hanau, Fed. Rep. of Germany

[21] Appl. No.: 230,681

[22] Filed: Aug. 8, 1988

Related U.S. Application Data

[63] Continuation-in-part of Ser. No. 115,264, Oct. 30, 1987, abandoned.

[30] Foreign Application Priority Data

Aug. 8, 1987 [DE] Fed. Rep. of Germany ....... 3726488

[51] Int. Cl.$^5$ ............................................. C03C 25/02
[52] U.S. Cl. ..................................... 65/60.2; 65/60.4; 65/60.8; 65/102; 204/192.27; 427/109; 427/165
[58] Field of Search .................. 65/60.4, 60.8, 106, 65/60.2, 102, 107; 427/109, 163, 165; 204/192.15, 192.22, 192.23, 192.26, 192.27, 192.28, 192.29

[56] References Cited

U.S. PATENT DOCUMENTS

| | | | |
|---|---|---|---|
| 3,944,440 | 3/1976 | Franz | 427/162 |
| 3,978,273 | 8/1976 | Groth | |
| 4,166,876 | 9/1979 | Chiba et al. | 427/109 |
| 4,188,452 | 2/1980 | Groth | 65/60.2 X |
| 4,334,523 | 6/1982 | Spanoudis | 428/650 |
| 4,337,990 | 7/1982 | Fan et al. | 350/1.7 |
| 4,413,877 | 11/1983 | Suzuki et al. | 204/192.15 |
| 4,414,254 | 11/1983 | Iwata et al. | 428/424.7 |
| 4,462,883 | 7/1984 | Hart | 204/192.26 |
| 4,497,700 | 2/1985 | Groth et al. | 428/428 |
| 4,548,691 | 10/1985 | Dietrich et al. | 204/192.29 |
| 4,650,557 | 3/1987 | Bitter | 204/192.12 |
| 4,715,879 | 12/1987 | Schmitte et al. | 65/60.4 X |
| 4,718,932 | 1/1988 | Pharms | 65/60.2 |
| 4,749,397 | 6/1988 | Chesworth et al. | 65/60.4 |
| 4,919,778 | 4/1990 | Dietrich et al. | |

FOREIGN PATENT DOCUMENTS

| | | |
|---|---|---|
| 35906 | 9/1981 | European Pat. Off. . |
| 2203943 | 7/1973 | Fed. Rep. of Germany ....... 65/60.2 |
| 3543178 | 6/1987 | Fed. Rep. of Germany . |
| 60-81876 | 5/1985 | Japan . |
| 61-284703 | 12/1986 | Japan . |
| 62-41740 | 2/1987 | Japan . |

OTHER PUBLICATIONS

O'Bannon, Dictionary of Ceramic Science and Engineering, Plenum Press, 1984, p. 123.
Webster's II New Riverside University Dictionary, Riverside Publishing Company, 1984, p. 533.
Chemical Abstracts, Bond 106 Nr. 16 Arp. 1987 p. 312, Abstract No. 124627 (JP-A 61284 703).

*Primary Examiner*—Robert L. Lindsay
*Attorney, Agent, or Firm*—Felfe & Lynch

[57] ABSTRACT

Method for making glazing with a high transmissivity in the visible spectral range and with a high reflectivity for thermal radiation as well as low surface resistance. On substrates of mineral glass a system of coatings is built up in the following order:
  Coating 1: oxide from the group, tin oxide, silicon dioxide, aluminum oxide, tantalum oxide, zirconium oxide, or mixtures thereof,
  Coating 2: alloy of 80 weight-percent of nickel and 20 weight-percent of chromium,
  Coating 3: silver or a silver alloy with at least 50 weight-percent silver content,
  Coating 4: alloy of 80 weight-percent of nickel and 20 weight-percent of chromium,
  Coating 5: oxide from the group tin oxide, silicon dioxide, aluminum oxide, tantalum oxide, zirconium oxide, or mixtures thereof.

Thereafter the substrate with the entire packet of coatings is heated to the softening temperature of the glass and bent to the final shape.

9 Claims, 2 Drawing Sheets

METHOD FOR THE PRODUCTION OF COATED GLASS WITH A HIGH TRANSMISSIVITY IN THE VISIBLE SPECTRAL RANGE AND WITH A HIGH REFLECTIVITY FOR THERMAL RADIATION

This application is a continuation-in-part of application Ser. No. 115,264, filed Oct. 30, 1987 abandoned.

BACKGROUND OF THE INVENTION

The invention relates to a method for the production of coated glass with a high transmissivity in the visible spectral range and with a high reflectivity for thermal radiation and a low surface resistance.

Such coated glass must admit a maximum percentage of the visible light and block a maximum percentage of the invisible spectral portion of solar radiation. In summertime this is intended to prevent the undesirable thermal radiation of sunlight from entering rooms. Especially in motor vehicles this effect is especially undesired on account of the sloping and therefore large front windshields and back windows. DE-OS 33 07 661 and EP-OS 104 870 to which respective U.S. Pat. No. 4,548,691 to Dietrich et al and 4,462,883 to Hart correspond, disclose sandwiching a silver layer and a very thin metal coating applied to the silver between two oxide layers. The thin metal coating protects the silver coating against chemical and thermal attack in the production of the outermost oxide coating. If such a sandwich, however, is exposed to temperatures above 150° C., the silver diffuses into the adjacent oxide and/or metal coating, and a great increase in the surface resistivity and a corresponding reduction of the transmissivity of the sandwich is to be observed, i.e., two of the important properties of the sandwich are impaired.

EP-PS 35 906 to which U.S. Pat. No. 4,413,877 to Suzuki et al corresponds, teaches the arrangement of a thin metal coating on one or both sides of a silver coating and the embedding of this sandwich also between two oxide layers. The thin metal layer is intended to achieve a greater long-term stability, although the experiments are limited to a temperature range up to 120° C. Since furthermore the absorptivity of the metal layers results in an impairment of the optical transparency of the coated substrates, the total thickness of the metal layers for the achievement of a particular transmissivity is limited, and therefore preferably only a single metal coating is to be applied to the side of the silver coating facing away from the substrate so as to limit the impairment of the transmissivity. It has been found, however, in the use of substrates of mineral glass and a system of layered coatings of this kind, that, in the event of heating to temperatures markedly above 150° C., an impairment of the coating properties also occurred, not only by a desirable elevation of the transmissivity in the visible range, but at the same time by an undesired increase in the surface resistance, so that the on-board voltage of a normal vehicle no longer suffices to produce enough heating in winter. Furthermore, spotting and undesirable light scatter have been observed, which are evidently due to a partial agglomeration and to a partial diffusion of the silver into the oxide layers.

This makes it possible only to conclude that the thickness of the metal layer or layers aimed at the desired high transmissivity in the visible range, which is to be attributed in part to motor vehicle regulations concerning motor vehicle windows, is no longer sufficient for the effective protection of the silver coating, especially at relatively high temperatures.

It is also known to produce curved or domed glazing with approximately similar spectral behavior by applying a silver coating embedded in other coatings to previously shaped glass substrates. This, however, requires special coating apparatus to provide for the different shapes of the substrates and by complex masking arrangements to compensate for the influence of different distances between elements of the area of the substrate and the coating sources and different angles of incidence on the coating material.

Lastly, by a method of an older patent application (P 35 43 178.4), to which U.S. Pat. No. 4,919,778 to Dietrich et al corresponds, substrates of mineral glass can be provided, by means of a vacuum coating process, with a five-layer system whereby the coated glass is given a high reflectivity for thermal radiation combined with a simultaneous high transmissivity for visible light. The five-layer system is selected so that the initially flat, coated glass can be subjected to a bending process in which the softening temperature of the glass of about 650° C. is reached, without altering negatively the properties of the coated glass. The coated glass thus treated furthermore has a low electrical resistance due to the coating, so that it can be heated by the application of an electrical current source.

When such coated glass are combined with another uncoated glass in a sandwich-like construction, they are especially suitable for use in motor vehicles as heatable front or rear windows having an additional function of protecting against intense solar radiation. In such sandwiched coated glass coated glass (laminated safety glass) a tough elastic interlayer of a plastic (e.g., polyvinylbutyrate) is placed between the two thin sheets of mineral glass with the exclusion of air. In the case of the coated glass according to the U.S. Pat. No. 4,919,778, the coated side is in direct contact with the plastic. The purpose of the plastic interlayer is to bond the two sheets permanently together in a stable unit which has a decidedly higher resistance to breakage than a single sheet. For this purpose a certain adhesion of the plastic to the glass or coating surface is necessary. Furthermore, the strong bonding of the tough plastic to the glass sheet is intended to prevent large glass splinters from being formed and scattered about in case the window is broken, in the event of an accident, for example, so as to minimize injuries to the vehicle occupants. To provide the assurance of such properties, certain test rules have been established and must be observed for the use of such sandwiched coated glass in motor vehicles. These rules and test methods are laid down in standards. In performing these tests on laminated safety glass which have been made by the method given in the older patent application, it was found that the bond of the sandwich system is insufficient, since the glass fragments would not adhere to the (elastic) plastic film when the window was broken.

It is therefore the object of the present invention to create a series of layers which will lead to a substantially improved adhesion of the series of coatings to one another without impairing the other physical data necessary for the planned application, especially the high light transmission, the electrical conductivity and the stability of the sandwich during the bending process.

SUMMARY OF THE INVENTION

This object is achieved according to the invention by the fact that, for the second and fourth layer, an alloy of about 80 weight-percent of nickel and about 20 weight-percent of chromium is used, the substrate with the entire series of coatings being heated at least to the softening temperature of the glass, being plastically deformed in the heated state, and cooled in the deformed state. Preferably the second and fourth layer are applied in a thickness which results in a greater absorption in the visible range than is desired in the final state, the heat treatment being performed in an oxidizing atmosphere until the average transmission in the visible range has increased above the transmission prior to the heat treatment by at least 5%, preferably by at least 8%.

By selecting the thickness of layers two, three and four it is desirable to set the maximum transmissivity in the visible range before the heat treatment at 70 to 80% and to raise it by the heat treatment to 80–87%.

Advantageously, the thickness of the third layer (silver) is established such that, after the heat treatment, a surface resistance between 2 and 10 ohms per square will result.

DETAILED DESCRIPTION OF THE PREFERRED EMBODIMENT

Glazings made with the specified material combination have a strength of adhesion even after the bending process that is comparable to the values which were achieved in uncoated glazings. The composition of the selected alloy should be maintained, since for example if the percentages of nickel are too high the transmissivity required for a windshield for visible light, amounting for example to 80±5%, cannot be achieved, or, if the chromium content is too high, the temperature stability will not be sufficient to survive the stresses of the bending process without damage to the sandwich.

The invention admits of a great variety of embodiments; one of them is further described below in conjunction with a drawing representing the layered construction and two graphs.

Figure 1:
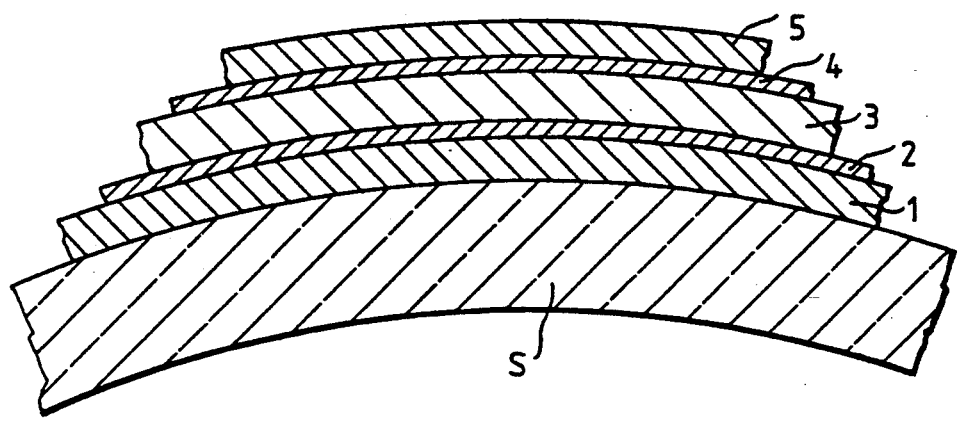
FIG. 1 is a cross-sectional view of the layers comprising the glazing of the instant invention.

In FIG. 1, the substrate, indicated at S, consists of a mineral glass such as a common float glass—a sodium silicate glass, for example. On this substrate a first coating 1 is deposited, of an oxide from the group, tin oxide, silicon dioxide, aluminum oxide, tantalum oxide, zirconium oxide, or mixtures thereof. On that is deposited a second coating 2 of about 80 weight-percent nickel and about 20 weight-percent chromium. Next follows a third coating 3 of silver or a silver alloy containing at least 50 weight-percent silver, and on this is a fourth coating 4 of about 80 weight-percent nickel and about 20 weight-percent chromium, and, as the final or covering layer, a fifth coating 5 follows, which like the first coating again consists of an oxide from the group, tin oxide, silicon dioxide, aluminum oxide, tantalum oxide, zirconium oxide or a mixture thereof. It is apparent that, with regard to the third, silver layer, the layers about it need not be of symmetrical composition, but that the coating materials can vary among the metals or oxides of a group.

In the case of the practical embodiment represented in the graphs, coated glass of float glass are provided with coatings in the order, tin oxide - NiCr - Ag - NiCr - tin oxide, in a vacuum coating apparatus for flat glass which is equipped with high-power sputtering cathodes (magnetron cathodes). The individual coatings have the following thicknesses:

| Coating 1: | tin oxide | 35 nm |
| --- | --- | --- |
| Coating 2: | NiCr | approx. 2 nm (*) |
| Coating 3: | Ag | 20 nm |
| Coating 4: | NiCr | approx. 2 nm (*) |
| Coating 5: | tin oxide | 35 nm |

(*) Adapted by experiment, so that the maximum transmission of the intermediate product, i.e. prior to the application of heat in the bending process, amount to 77% in the visible range.

Figure 2:
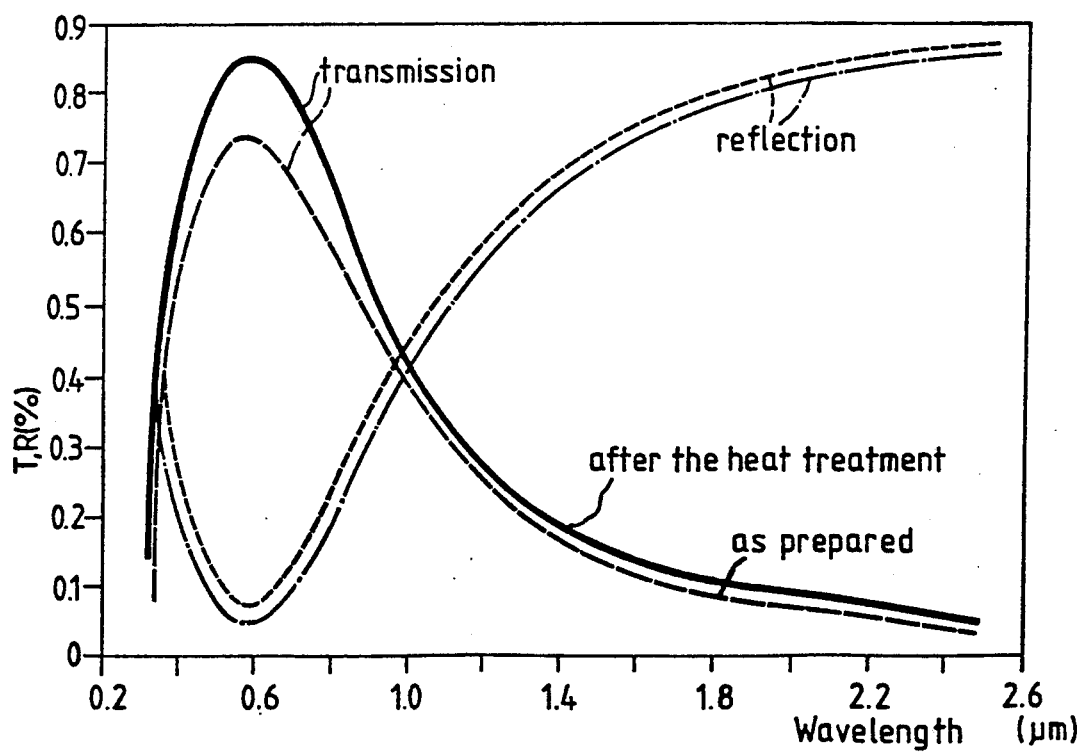
FIG. 2 shows the transmission and reflection of the coated glass for various wavelengths, before and after heat treatment.

The optical data of the tempered and untempered coated glass is presented in FIG. 2. This glass was subjected together with an uncoated flat glass pane of the same dimensions to a bending process in an oven with uniform temperature distribution, in which peak temperatures of about 640° C. occur over a period of about 5 minutes. The light transmission of the coated glass after this process amounts after cooling to 85%, and the surface resistance is 4.2 ohms/square. Accordingly the two sheets bent together were used to form safety laminated glass; this was done by interposing a film of polyvinyl butyrate and applying a thermal process under a vacuum. If the resulting laminated safety glass is tested, the light transmission is found to be 77% and the light reflection is 14%, values which are within the limits required for the approval of the glass as an automobile windshield. At the same time the safety tests according to the pertinent standards (i.e., falling ball test etc.) produced the required ratings. In particular, the adhesion of the coated glass to the plastic film is sufficient to prevent the release of large glass fragments.

Figure 3:
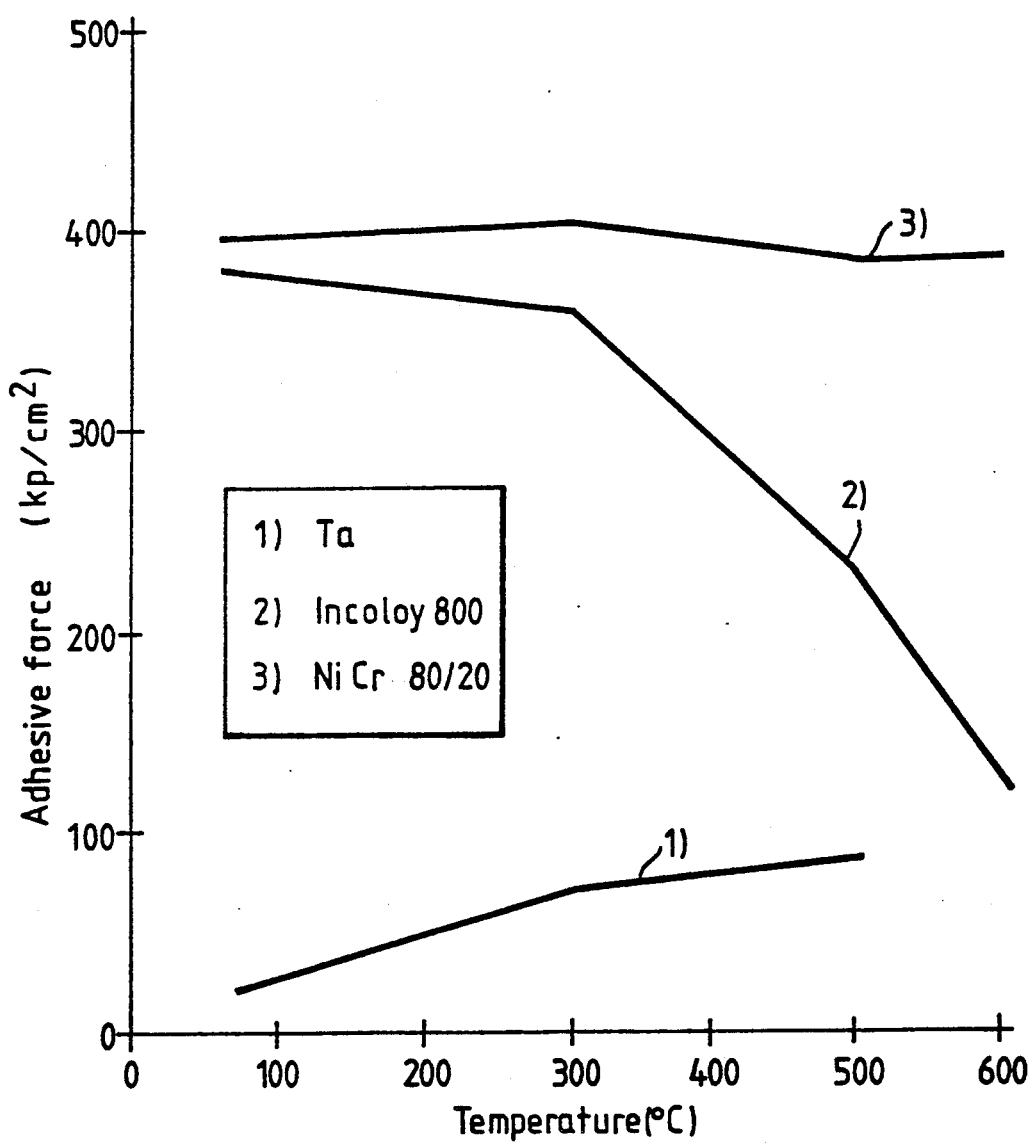
FIG. 3 shows the adhesive force of the second and fourth layers after heat treatment.

Referring to FIG. 3, the adhesive strength of the layer system has been tested as a function of the temperature. The best results have been achieved with NiCr (80/20 weight percent) as layers 2 and 4 (curve 3). For this material, the obtained adhesivity value of about 400 kp/cm$^2$ is independent of the temperature.

We claim:

1. Method for the production of coated glass with a high transmissivity in the visible spectral range and with a low surface electrical resistivity and a high reflectivity for thermal radiation by cathode sputtering of coatings on a substrate consisting of mineral glass, the cathode sputtering comprising providing on the mineral glass:
    a) a first coating comprising at least one oxide from the group consisting of tine oxide, silicon dioxide, aluminum oxide, tantalum oxide and zirconium oxide,
    b) a second coating of an alloy of about 80 weight-percent nickel and about 20 weight-percent of chromium,
    c) a third coating of silver or silver alloy containing at least 50 weight-percent of silver,
    d) a fourth coating of the alloy forming the second coating, and
    e) a fifth coating of an oxide form the oxides forming the group of said first coating, the substrate then being heated with the coatings a) through e) on it to at least the softening temperature of the glass, plastically shaped in the heated state, and cooled in the shaped state.

2. Method according to claim 1, wherein
   a) said coatings b) and d) are applied in a thickness that leads to a greater absorption in the visible range before heat treatment than after heat treatment and
   b) the heat treatment of said substrate and coatings is performed in an oxidizing atmosphere until the average transmission in the visible range through the substrate and coatings has increased at least 5%.

3. Method according to claim 1, wherein the maximum transmission in the visible range through the substrate and coatings is established by selecting the thickness of the coatings b), c) and d), to be 70-80% transmission before the heat treatment, and increasing it by the heat treatment to 80-87% transmission.

4. Method according to claim 1, wherein thickness of the coating c) is adjusted so that, after the heat treatment, a surface electrical resistivity of between 2 and 10 ohms/square results.

5. Method according to claim 1 wherein the fifth coating comprises 5 to 15 weight-percent of tine and 4-8 weight-percent of at least one from the group consisting of antimony, fluorine, and indium oxide.

6. Method according to claim 1, wherein the first a) nd the fifth coating e) are produced by cathode sputtering of metal targets in a reactive atmosphere and the second b), third c) and fourth coating d) are produced by cathode sputtering of metal or metal alloy targets in an inert atmosphere.

7. Method as in claim 1 wherein the respective coatings are sputtered to the following thicknesses:
   a) first coating: 35 nm
   b) second coating: 2 nm
   c) third coating: 20 nm
   d) fourth coating: 2 nm
   e) fifth coating: 35 nm
and wherein, the thickness of the second and fourth coatings may be varied so that the transmission of light through the substrate and coatings in the visible range is 77% prior to heat treatment.

8. Method as in claim 1 wherein the second coating consists wholly of tin oxide.

9. Method of claim 2 wherein the transmission of visible light through the substrate and coatings after heat treatment increases by at least 8%.

* * * * *